United States Patent [19]
Baudat et al.

[11] Patent Number: 5,503,262
[45] Date of Patent: Apr. 2, 1996

[54] APPARATUS FOR THE CLASSIFICATION OF A PATTERN FOR EXAMPLE ON A BANKNOTE OR A COIN

[75] Inventors: Gaston Baudat; Christian Voser, both of Genève, Switzerland

[73] Assignee: Mars Incorporated, McLean, Va.

[21] Appl. No.: 13,708

[22] Filed: Feb. 4, 1993

[30] Foreign Application Priority Data

Mar. 10, 1992 [CH] Switzerland ............... 00 753/92

[51] Int. Cl.$^6$ .................................................. G07D 7/00
[52] U.S. Cl. ........................................ 194/206; 194/317
[58] Field of Search ................................ 194/206, 207, 194/317, 318, 319; 209/534

[56] References Cited

U.S. PATENT DOCUMENTS 4,797,937  1/1989  Tajima ........................ 209/584 X

FOREIGN PATENT DOCUMENTS

| 0056116 | 7/1982 | European Pat. Off. . |
| 0067898 | 12/1982 | European Pat. Off. . |
| 0084137 | 7/1983 | European Pat. Off. . |
| 0294497 | 12/1988 | European Pat. Off. . |
| 3040963 | 5/1981 | Germany . |
| 640433 | 1/1984 | Switzerland . |
| 2059129 | 4/1981 | United Kingdom . |
| 2062854 | 5/1981 | United Kingdom . |

*Primary Examiner*—F. J. Bartuska
*Attorney, Agent, or Firm*—Davis Hoxie Faithfull & Hapgood

[57] ABSTRACT

For the classification of a pattern in particular on a banknote or a coin, a receiving system detects, by a measurement procedure, vectors of a test item, a pre-processing system transforms the measured vectors into local feature vectors ALCi(l) and a learning classification system carries out a plurality of testing operations. A first activity compares in a first testing operation each of the local feature vectors ALCi(l) to a vectorial reference value. It is only if the first testing operation takes place successfully that the first activity, by means of first estimates which are stored in a data base, links the local feature vectors ALC(l) to provided global line feature vectors AGIi. In a second testing operation a third activity compares the global line feature vectors AGIi to corresponding reference values and, if the second testing operation is successful, computes a single global surface vector AGF of which a fourth activity, in a third testing operation, compares its distance in accordance with Mahalanobis relative to an estimated surface vector to a reference value. The test item is reliably clasified if all three testing operations take place successfully.

9 Claims, 2 Drawing Sheets

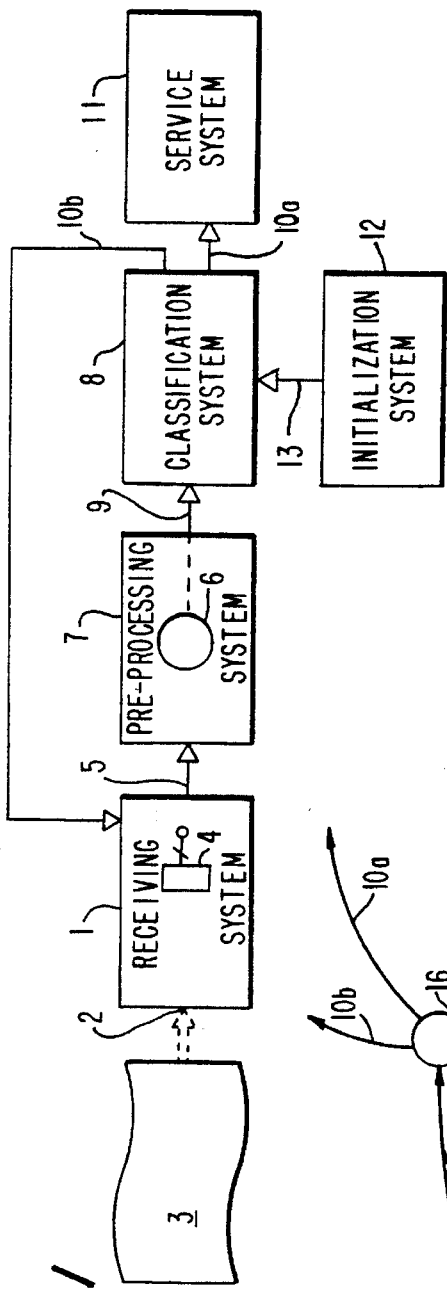
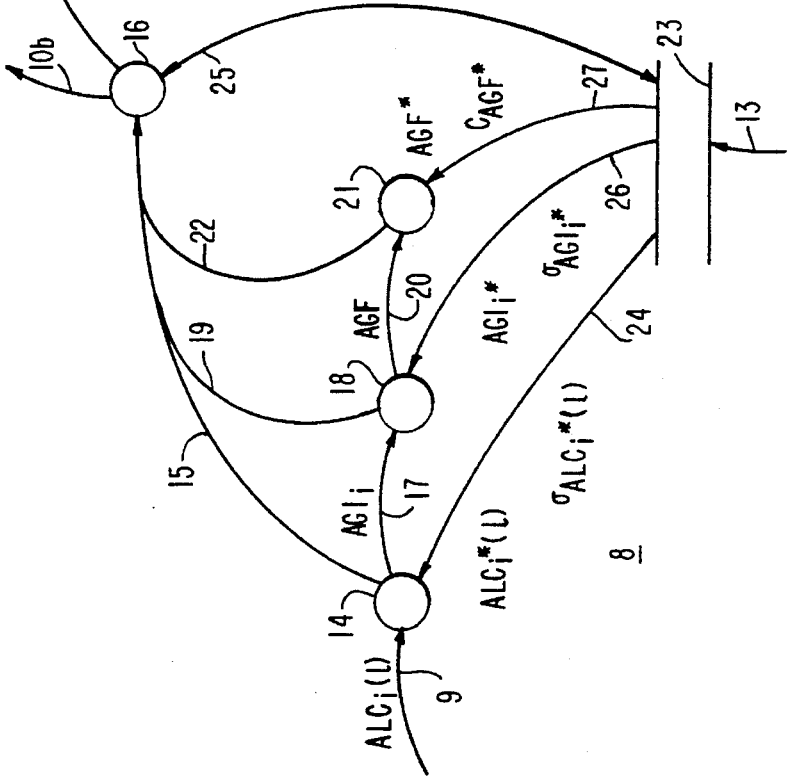

APPARATUS FOR THE CLASSIFICATION OF A PATTERN FOR EXAMPLE ON A BANKNOTE OR A COIN

BACKGROUND OF THE INVENTION

1. Field of the Invention

The invention relates to an apparatus for the classification of a pattern, for example on a banknote or a coin.

2. Description of the Prior Art

Such an apparatus is advantageously used in automatic sales machines, automatic money changing machines and the like, where classification is effected on the one hand in accordance with value, for example as between one, two and five dollar notes, and/or on the other hand as between originals and copies (forgeries).

It is known for intensity values of electromagnetic radiation reflected from image portions of a test item to be processed in such a way that the test item can be compared to a pixel matrix (European patent EP 0 067 898 B1) of an original, or that differences in relation to an original are printed out and evaluated, in the form of an angle between two n-dimensional vectors (German patent application DE 30 40 963 A1) or as a cross-correlation function (European patent application EP 0 084 137A2).

It is also known (Swiss patent application No. 640 433 A5) for various physical measurement parameters of a test item to be respectively compared to corresponding stored limit values substantially independently of each other, and, after successful classification, to improve the limit values by means of the measurement parameters of the accepted test item.

In addition various attempts at providing learning or self-adapting classifiers are known (H. Niemann: Klassifikation von Mustern (Classification of patterns)—Berlin, Heidelberg, Tokyo, Springer 1983) in which the class ranges are continually altered with classified patterns and which in the classification operation require a considerable amount of computing expenditure, which in practical use can result in unacceptable response times.

SUMMARY OF THE INVENTION

An object of the present invention is to design an apparatus for the classification of a pattern in such a way that a pattern can be classified inexpensively and within an acceptable response time with the desired degree of certainty.

In accordance with the invention, there is provided apparatus for classifying a pattern, said apparatus comprising:
(i) a receiving system;
(ii) a pre-processing system;
(iii) a learning classification system, the learning classification system comprising a data base for the classification of a pattern, for example, on a banknote or a coin, by means of the values of physical features which are supplied to said receiving system; and a service system, said receiving system and said classification system being connected in an order of enumeration substantially to form a cascade and said service system being connected to an output of said cascade; wherein:
(a) said pre-processing system
  (a.a) comprises means for performing a pre-processing activity which transforms said values of said physical features into a plurality of local feature vectors $ALC_i(l)$; and
(b) said classification system comprises means for performing a plurality of activities which access said data base and of which:
  (b.a) a first activity:
    (b.a.a) in a first testing operation for each instance in respect of said local feature vectors $ALC_i(l)$ transformed with an operator $\Phi \{\}$, performs a comparison with a vectorial reference value $Q_{ALCi}(l)$;
    (b.a.b) communicates a result of said first testing operation to a second activity by way of first data channel which leads from said first activity to a second activity; and
    (b.a.c) computes a global line feature vector $AGI_i$ from instances of each said local feature vector $ALC_i(l)$ by means of instances of an associated first vectorial estimate $ALC_i^*(l)$ stored in said data base and an associated second vectorial estimate $\sigma_{ALCi}^*(l)$ stored in said data base, whereafter, only if said first testing operation is successfully performed,
  (b.b) all global line feature vectors $AGI_i$ are transferred to a third activity by way of a second data channel which leads from said first activity to said third activity.
  (b.c) said third activity:
    (b.c.a) in a second testing operation for each said global line feature vector $AGI_i$ transformed with an operator $Q \{\}$ which uses a third vectorial estimate $AGI_i^*$ and a fourth vectorial estimate $\sigma_{AGIi}^*$, performs a comparison with a further vectorial reference value $Q_{AGIi}$;
    (b.c.b) communicates the result of the second testing operation to said second activity by way of a third data channel which leads from said third activity to said second activity; and
    (b.c.c) computes a single global surface feature vector AGF from the said global line feature vectors $AGI_i$, whereafter, only if said second testing operation is successfully performed,
  (b.d) said global surface feature vector AGF is transferred to a fourth activity by way of a fourth data channel which leads from said third activity to said fourth activity;
  (b.e) said fourth activity:
    (b.e.a) computes the mahalanobis distance $d^2$ between said global surface feature vector AGF and a fifth vectorial estimate AGF* stored in said data base, by means of a covariance matrix $C_{AGF}^*$;
    (b.e.b) in a third testing operation performs a comparison between the Mahalanobis distance $d^2$ and a reference value $Q_d2$; and
    (b.e.c) communicates the result of the third testing operation to the second activity by way of a fifth data channel which leads from the fourth activity to said second activity,
  (b.f) only if all three of said first, second and third testing operations are successfully performed, said second activity (16)
  (b.f.a) computes
    (b.f.a.a) new first estimates $ALCi^*(l)$.
    (b.f.a.b) new second estimates $\sigma_{ALCi}^*(l)$,
    (b.f.a.c) new third estimates $AGIi^*$,
    (b.f.a.d) new fourth estimates $\sigma_{AGIi}^*$ and
    (b.f.a.e) a new fifth estimate AGF* and also
    (b.f.a.f) a new covariance matrix $C_{AGF}^*$ and thereby
  (b.f.b) updates said data base and
  (b.f.c) also communicates to said service system the ascertained class of said test item.

BRIEF DESCRIPTION OF THE DRAWINGS

FIG. 1 shows a block circuit diagram of an apparatus for the classification of a pattern, FIG. 2 is a data flow chart of a classification system for banknotes.

DESCRIPTION OF THE PREFERRED EMBODIMENTS

Figure 3:
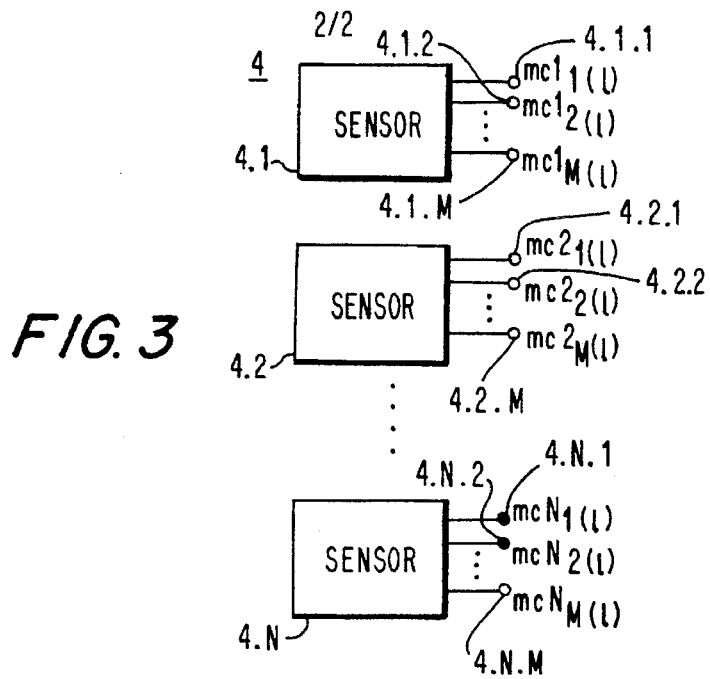
FIG. 3 shows a sensor group for feature acquisition in a receiving system.

In FIG. 1 reference numeral 1 denotes a receiving system which in substance comprises an inlet 2 and a transportation system (not shown) for a test item 3 as well as a sensor group 4 with which a pattern of the test item 3 is measured. The receiving system 1 is connected by a feature channel 5 to a pre-processing system 7 which has a least one pre-processing activity 6. A learning or self-adapting classification system 8 is connected to the pre-processing system 7 by way of an input channel 9 and to a service system 11 by way of a first output channel 10a. The receiving system 1, the pre-processing system 7, the classification system and the service system 11 are therefore essentially connected by way of channels to provide a cascade array which is terminated by the service system 11.

It is possible for an initialisation system 12 to be connected to the classification system 8 by way of an initialisation channel 13.

FIG. 2 shows the structure in principle of the classification system 8, by reference to a data flow chart. In the selected representation mode which is known from the literature (D. J. Hatley, I. A. Pirbhai: Strategies for Real-Time System Specification, Dorset House, N.Y. 1988), a circle denotes an activity and an arrow denotes a communication channel for the transmission of data and/or events, wherein the arrow head points in the essential data flow direction. A data memory or pool which is generally available to a plurality of activities is represented by two equal-length parallel lines. In addition, an arrangement comprising two activities which are connected by a communication channel is, for example, equivalent to a single activity which performs all tasks of the two activities.

Each activity is constructed in known fashion as an electronic circuit or in software as a process, a program portion or a routine.

The input channel 9 leads to a first activity 14 which is connected by way of a first channel 15 to a second activity 16 and by way of a second channel 17 to a third activity 18 which in turn is linked by way of a third channel 19 to the second activity 16 and by way of a fourth channel 20 to a fourth activity 21 from which a fifth channel 22 goes to the second activity 16 which is connected to the output channel 10a. A data memory or pool 23 which contains a data base of the classification system 8 is connected by way of a sixth channel 24 to the first activity 14, by way of a seventh channel 25 to the second activity 16, by way of an eighth channel 26 to the third activity 18, by way of a ninth channel 27 to the fourth activity 21 and to the initialisation channel 13.

In FIG. 3, a sensor 4.1, 4.2 to 4.N of the sensor group 4 comprising a number N of sensors has a number of M of feature outputs 4.1.1, 4.1.2 to 4.1.M and 4.2.1, 4.2.2 to 4.2.M and 4.N.1, 4.N.2 to 4.N.M respectively. The number N and the number M are independent of each other and can be freely selected. By way of example the number N and the number M are three.

The test item 3—in this example a banknote—is passed at the inlet 2 (FIG. 1) to the transportation system which for the purposes of producing a measurement value takes the test item 3 past the sensor group 4 which measures the pattern of the test item 3 in known manner at discrete times 1. The sensors 4.1 to 4.N are advantageously arranged parallel to the plane of transportation movement of the test item 3 and perpendicularly to the direction of transportation movement thereof, in juxtaposed relationship, so that it is possible to measure a number N of parallel tracks on the test item 3, each of the sensors 4.1 to 4.N respectively measuring M different features. The whole of the values mc(1) of at least one row of a physical feature of the test item 3 is regarded as the pattern. In this example the pattern comprises the number N of rows each having a number L of values, wherein each row includes the number M of features. The number L for the observed length of the test item is given by the scanning rate selected speed of the test item 3 in the transportation system, and in this example is thirteen or twenty four.

At each sensor 4.1, 4.2 and 4.N respectively (see FIG. 3), the values of the features mc1(1) and mc2(1) respectively are available, at the times L, at the feature outputs 4.1.1 to 4.1.M and 4.2.1 to 4.2.M and 4.N.1 to 4.N.M respectively. The times L are numbered from 1 to L.

If the test item is a lira or a US$ note, the sensor 4.1 or 4.2 or 4.N respectively, for reliable classification, advantageously measures the intensity values of an electromagnetic radiation reflected by image portions of the test item which is irradiated with at least one light source, at each time L—or at the position L of the test item with respect to the sensor group 4—in the three spectral regions green, red and infra-red. Thus for example intensity values of green occur at the feature outputs 4.1.1, 4.2.1 and 4.N.1, intensity values of red occur at the feature outputs 4.1.2, 4.2.2 and 4.N.2, and infra-red at the feature outputs 4.1.3, 4.2.3 and 4.N.3.

If desired, the sensor group 4 may also have other sensors which are for example magnetic or acoustic. If a coin is being tested, its pattern can also be from the sound levels of selected frequencies (instead of the positions L) of the sound spectrum which occurs in the event of coin impact.

The values in respect of the physical features, which are detected at the times L (L=1 ... L) by the sensor 4.1 and 4.2 and 4.N respectively are grouped for further processing as a common vector mc1(1) and mc2(1) and mcN(1) respectively. In that respect each of the measured vectors has the number M of components or the dimension of the measured vectors mci(1) is M. That means that the measured vectors are defined as follows:

$$(mci(1))^T = (mci_1(1), mci_2(1) \ldots mci_M(1)) \quad \text{(E1)}$$

with i=1 ... N and l=1 ... L. On account of more convenient representation, in the definition (E1) the measured vector mci(1) is transposed, that is to say it is written as a line vector. The superscript letter T in the name of a vector in the definition (E1) and also hereinafter refers to a transposed representation of the vector.

The measured vectors mci(l) are transferred from the receiving system 1 (FIG. 1) by way of the feature channel 5 to the pre-processing system 7, whereupon the pre-processing activity 6 forms Fi local feature vectors ALCi(l) from the measured vectors mci(l) by transforms Fi. A transform Fi is linear or non-linear. The dimension K of the local feature vectors ALCi(l) is the same as or different from the dimension M of the measured vectors mci(l). The following applies:

$$ALCi(l) = Fi\{mci(l)\}, \text{ wherein } i = 1 \ldots N \tag{E2}$$

$$(ALCi(l))^T = (ALCi_1(l), ALCi_2(l), \ldots ALCi_K(l)) \tag{E3}$$

wherein K=M or K<>M

For the purposes of more convenient representation, in the definition (E3) the local feature vector ALCi(l) is transposed, that is to say written as a line vector.

One of the transforms Fi is for example a normalisation of a spectral range and can read as follows for the first component of ALC2(l):

$$ALC2_1(l) = \frac{mc2_1(l)}{\sum\limits_{j=1}^{M} mc2_j(l)} \tag{E4}$$

If the test item 3 is for example a lira or US$ note and each of the measured vectors mci(l) has a component for the spectral range green, a component for the spectral range red and a component for the spectral range infra-red, in which respect for example an intensity value of the spectral range green is associated with the first component $mci_1(l)$, an intensity value of the spectral range red is associated with the second component $mci_2(l)$ and an intensity value of the spectral range infra-red is associated with the third component $mci_3(l)$, the measured vectors mci(l), for reliable classification, are advantageously transformed into local feature vectors ALCi(l), as follows:

A component, for example that with the index one, of each local feature vector ALCi(l) contains the brightness of the sensor 4.i, for i in the range of 1 ... N, at the time l, for l in the range of 1 ... L as the sum of all intensity values of the measured spectra:

$$ALCi_1(l) = mci_1(l) + mci_2(l) + mci_3(l) \tag{E5}$$

A further component, for example that with the index two, contains the normalised intensity value of the spectral range green of the sensor 4.i at the time l:

$$ALCi_2(l) = \frac{mci_1(l)}{mci_1(l) + mci_2(l) + mci_3(l)} \tag{E6}$$

A third component, for example that with the index three, contains the normalised intensity value of the spectral range red of the sensor 4.i at the time l:

$$ALCi_3(l) = \frac{mci_2(l)}{mci_1(l) + mci_2(l) + mci_3(l)} \tag{E7}$$

A fourth component, for example that with the index four, contains the intensity value, which is normalised over the track of the sensor 4.i, of the spectral range green, at the time l:

$$ALCi_4(l) = \frac{mci_1(l)}{\frac{1}{L} \cdot \sum\limits_{j=1}^{L} mci_1(j)} \tag{E8}$$

A fifth component, for example that with the index five, contains the intensity value, which is normalised over the track of the sensor 4.i, of the spectral range infra-red at the time l:

$$ALCi_5(l) = \frac{mci_3(l)}{\frac{1}{L} \cdot \sum\limits_{j=1}^{L} mci_3(j)} \tag{E9}$$

The entirety of the local feature vectors ALCi(l)—that is to say N·L vectors—are transmitted from the pre-processing system 7 by way of the input channel 9 to the classification system 8 which effects classification of the test item 3 by means of further test operations and further transforms.

In the following description of the mode of operation of the classification system 8, the basis taken is a specific situation which involves testing whether the test item 3 does or does not belong precisely to a specific target class. All classification problems which are of interest here can be divided into individual cases, in each of which the test item 3 is respectively checked with precisely one target class, that corresponding to the specific situation described. In that respect, if necessary, the described classification operation is carried out for each of the possible target classes, which in known manner can be effected by a single classification system 8 in a loop or, if the classification system 8 has a plurality of instances, simultaneously in parallel (concurrently), in which case the checking operation can be immediately broken off when the class of the test item 3 is established, but is at the latest broken off when the test item has been compared to all target classes.

The first activity 14 (FIG. 2) compares in a first testing operation each instance of the local feature vectors ALCi(1) transformed with an operator $\Phi\{\}$ to a predefined associated vectorial reference value $Q_{ALCi}(1)$. All of the N·L vectorial reference values $Q_{ALCi}(1)$ have the same dimension K as the local feature vectors ALCi(1) and only real positive components. The first testing operation is successfully performed (true) when and only when the following Boolean expression is true for all N·L local feature vectors ALCi(1):

$$\Phi\{ALCi(1)\} \leq Q_{ALCi}(1) \tag{E10}$$

which means that each of the K components of the transformed vector $\Phi\{ALCi(1)\}$ is smaller than or equal to the corresponding component of the vectorial reference value $Q_{ALCi}(1)$.

The transform with the operator $\Phi\{\}$ which is used in the Boolean expression (E1O) is defined as follows by means of first vectorial estimates ALCi*(1) of a mean of the local feature vectors ALCi and second vectorial estimates $\sigma_{ALCi}*(1)*$ of a dispersion mode of the local feature vectors ALCi(1):

$$(\Phi\{ALCi(1)\})^T = \left( \frac{|ALCi_1(1) - ALCi*_1(1)|}{|\sigma_{ALCi}*_1(1)|}, \frac{|ALCi_2(1) - ALCi*_2(1)|}{|\sigma_{ALCi}*_2(1)|}, \ldots, \frac{|ALCi_K(1) - ALCi*_K(1)|}{|\sigma_{ALCi}*_K(1)|} \right) \tag{E11}$$

For the purposes of more convenient representation, in the definition (E11) the vector of the dimension K, which results due to the transform operation $\Phi\{\}$, is transposed, that is to say written as a line vector.

The first vectorial estimates ALCi*(1) and the second vectorial estimates $\sigma_{ALCi}*(1)$ are of the dimension K and filed in the data base in the data memory or pool 23, which is accessible by way of the sixth channel 24 for the first activity 14.

In a preferred embodiment the estimates ALCi*(1) and $\sigma_{ALCi}*(1)$ are initialised by the initialisation system 12 by way of the initialisation channel 13.

The first activity 14 transmits the result of the first testing operation to the second activity 16 by way of the first channel 15 and, if the first testing operation is successful, computes from the N·L local feature vectors ALCi(1) a set with the number N of global line feature vectors AGIi of the same dimension K.

A global line feature vector AGIi which expresses the dispersion follows from the application of an operator EA$\{\}$ to all K components of the corresponding local feature vectors ALCi(1):

$$(AGIi)^T = (EA\{ALCi_1\}, EA\{ALCi_2\}, \ldots, EA\{ALCi_K\}) \quad (E12)$$

wherein the operator EA{} is defined as follows:

$$EA\{ALCi_j\} = \frac{1}{L} \cdot \sum_{l=1}^{L} \frac{|ALCi_j(1) - ALCi^*_j(1)|}{|\sigma_{ALCi^*j}(1)|} \quad (E13)$$

On account of more convenient representation, in the definition (E12) the line feature vector AGIi is transposed, that is to say written as a line vector. The index j lies in the range of from 1 to K.

The N line feature vectors AGIi are passed by way of the second channel 17 to the third activity 18 which in a second testing operation compares each of the global line feature vectors AGIi which are transformed with an operator Ω{}, to a predefined associated vectorial reference value $Q_{AGIi}$. All of the N vectorial reference values $Q_{AGIi}$ have the same dimension K as the line feature vectors AGIi and only real positive components. The second testing operation is successfully fulfilled (true) when and only when the following Boolean expression is true for all N global line feature vectors AGIi:

$$\Omega\{AGIi\} \leq Q_{AGIi} \quad (E14)$$

that is to say each of the K components of the transformed vector Ω{AGIi} is less than or equal to the corresponding component of the vectorial reference value $Q_{AGIi}$.

The transform with the operator Ω{} which is used in the Boolean expression (E14) is defined as follows by means of third vectorial estimates AGIi* of a mean of the global line feature vectors AGIi and fourth vectorial estimates $\sigma_{AGIi}^{**}$ of a dispersion mode of the global line feature vectors AGIi:

$$(\Omega\{AGIi\})^T = \left( \frac{|AGIi_1 - AGIi^*_1|}{|\sigma_{AGIi^*1}|}, \frac{|AGIi_2 - AGIi^*_2|}{|\sigma_{AGIi^*2}|}, \ldots, \frac{|AGIi_K - AGIi^*_K|}{|\sigma_{ALCi^*K}|} \right) \quad (E15)$$

For the purposes of more convenient representation in the definition (E15) the vector of the dimension K which results by the transform Ω{} is transposed, that is to say written as a line vector.

The third vectorial estimates AGIi* and the fourth vectorial estimates $\sigma_{AGIi}^*$ are of the dimension K and filed in the data base in the data memory or pool 23, which is accessible by way of the eighth channel 26 for the third activity 18.

In a preferred embodiment the estimates AGIi* and $\sigma_{AGIi}^*$ are initialised by the initialisation system 12 by way of the initialisation channel 13.

The third activity 18 transmits the result of the second testing operation to the second activity 16 by way of the third channel 19 and, if the second testing operation is successful, computes from the N global line feature vectors AGIi a single global surface feature vector AGF of the same dimension K, in accordance with the following formula:

$$AGF = \frac{1}{N} \cdot \sum_{i=1}^{N} AGIi \quad (E16)$$

The third activity 18 passes the surface feature vector AGF by way of the fourth channel 20 to the fourth activity 21 which computes the Mahalanobis distance $d^2$, which is known in the literature, between the surface feature vector AGF and a fifth vectorial averaged estimate AGF* of the surface feature vector AGF and in a third testing operation compares the computed distance $d^2$ to a scalar reference value $Q_d^2$. The scalar and real distance $d^2$ is defined as follows by means of a covariance matrix $C_{AGF}^*$, as follows:

$$d^2 = (AGF - AGF^*)^T \cdot (C_{AGF}^*)^{-1} \cdot (AGF - AGF^*) \quad (E17)$$

wherein the covariance matrix $C_{AGF}^*$ of the dimension K·K is of a quadratic and diagonally symmetrical configuration so that $C_{AGF}^*{}_{m,n} = C_{AGF}^*{}_{n,m}$ with m<>n. The covariance matrix only has real elements which in the diagonal m=n are estimates $(\sigma_{AGF}^*{}_m)^2$ of the variances, defined in known manner, of the components $AGF_m$ of the surface feature vector AGF and thereside estimates $Cov^*_{m,n}$ of the covariances, which can be computed in accordance with the known rule, between first components $AGF_m$ and second components $AGF_n$:

$$C_{AGF}^* = \begin{bmatrix} (\sigma_{AGF}^*{}_1)^2 & Cov^*_{1,2} & \ldots & Cov^*_{1,K} \\ Cov^*_{2,1} & & & \cdot \\ \cdot & & & \cdot \\ \cdot & & & \cdot \\ Cov^*_{K,1} & \ldots & & (\sigma_{AGF}^*{}_K)^2 \end{bmatrix} \quad (E18)$$

The covariance matrix $C_{AGF}^*$ and the fifth estimate AGF* are filed in the data base in the data memory or pool 23, which is available for the fourth activity 21 by way of the ninth channel 27. The covariance matrix $C_{AGF}^*$ and the estimate AGF* are advantageously initialised by the initialisation system 12 by way of the initialisation channel 13.

The third testing operation is successfully performed (true) if the following Boolean expression is true:

$$d^2 \leq Q_d^2 \quad (E19)$$

The result of the third testing operation is passed to the second activity 16 by way of the fifth channel 22.

The second activity 16 evaluates the results of the three testing operations and passes the result by way of a second output channel 10b which is connected to the receiving system 1 which thereupon either passes the test item 3 to a cash box or rejects it. It is only if the first testing operation and the second testing operation and also the third testing operation are successful that the associated target class in respect of the test item 3 is reliably established, which notifies the second activity to the service system 11 by way of the first output channel 10a—preferably by transmission of the established class of the test item—, whereupon the service system 11 can perform a service.

It is only if the target class of the test item 3 is reliably established that all estimates associated with the target class are recomputed, on the basis of the measured vectors mci(l) of the current test item 3, by the second activity 16, and up-dated in the data base.

By means of a weighting factor p, wherein $p \geq 0$, the new estimates identified by an index t are computed in known manner in the following manner from the corresponding old estimates which are identified by an index t-1 and the corresponding current feature vector of the test item:

$$ALCi^*(l)_t = (p \cdot ALCi^*(l)_{t-1} + ALCi(l))/(p+1) \quad (E20)$$

$$AGIi^*_t = (p \cdot AGIi^*_{t-1} + AGIi)/(p+1) \quad (E21)$$

$$AGF^*_t = (p \cdot AGF^*_{t-1} + AGF)/(p+1) \quad (E21a)$$

$$Cov^*_{(m,n)t} = \frac{p \cdot Cov^*_{(m,n)t-1} + (AGF_m - AGF^*_{(m)t-1})(AGF_n - AGF^*_{(n)t-1})}{p+1} \quad (E22)$$

While maintaining good classification qualities, it is possible to achieve a substantial saving in time, by new estimates of dispersions being computed only approximately and in the following manner:

$$\sigma_{ALCi}*(l)_t = \frac{p \cdot \sigma_{ALCi}*(l)_{t-1} + (\pi/2)^{1/2} \cdot |ALCi(l) - ALCi*(l)_{t-1}|}{p+1} \quad (E23)$$

$$\sigma_{AGIi}*_t = \frac{p \cdot \sigma_{AGIi}*_{t-1} + (\pi/2)^{1/2} \cdot |AGIi - AGIi*_{t-1}|}{p+1} \quad (E24)$$

The weighting factor p generally has a respective different current value in each of the equations (E20), (E21), (E21a), (E22), (E23) and (E24).

Instead of computing the square root from the difference of the two squared amounts of two vectors, as in known manner, in the respective formulae (E23) and (E24), for computation of the new estimate $\sigma_{ALCi}*(l)_t$ and $\sigma_{AGIi}*_t$ respectively, the amount of the difference between two vectors is multiplied by the factor $(\pi/2)^{1/2}$, which crucially reduces the expenditure with the large number of new estimates which are computed after each successful classification operation. With the same requirements for example the computing time for the described estimate updating operation is reduced by ten times.

Figure 4:
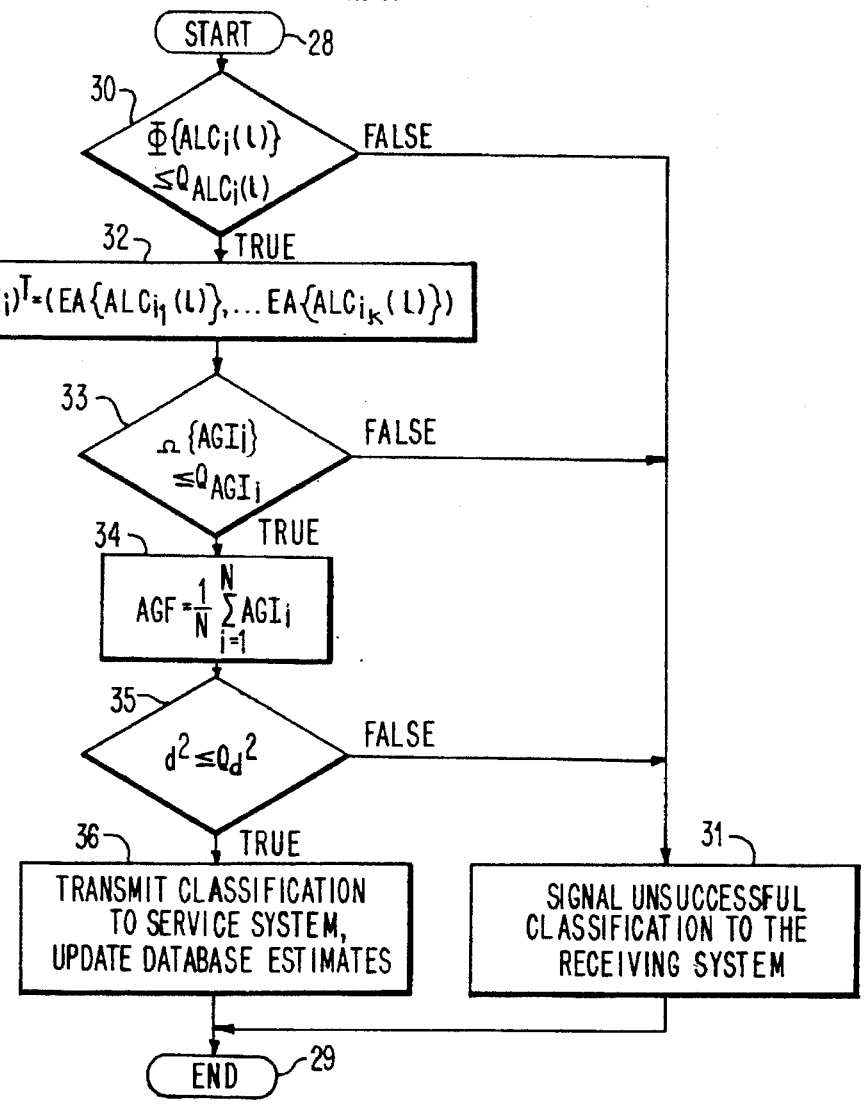
FIG. 4 shows a flow chart of the most important operations in the classification procedure.

The flow chart in FIG. 4 shows the most important operations which are necessarily performed or skipped between a beginning 28 and an end 29 by the classification system 8 for the test item in regard to each of the target classes depending on the nature of the classification operation.

After the beginning, a first branch 30 is followed either by an action block 31 or a first computation block 32 which is followed by a second branch 33. The second branch 33 leads either to the action block 31 or to a second computation block 34 which is followed by a third branch 35 which is followed by the action block 31 or a third computation block 36 which like the action block 31 is concluded with the end 29.

The first testing operation is crucial for the first branch 30; it is only if the associated Boolean expression (E10) is true that the N line feature vectors AGIi are computed in the first computation block 32 in accordance with the formula (E12) from the N·L local feature vectors ALCi(l), otherwise classification is no longer possible, so that it is terminated with the action block 31. The second branch 33 is controlled by the second testing operation. It is only if its Boolean expression (E14) is true that a single global surface feature vector AGF is computed in the second computation block 34 in accordance with the formula (E16) from the N global line feature vectors, otherwise the classification operation which is thus unsuccessful is concluded with the action block 31. The third branch is determined by the third testing operation, after which, if the Boolean expression (E19) is true, the third computation block 36 is performed, while otherwise it is the action block 31 that is performed.

It can be easily seen from the flow chart that on the one hand the third computation block 36 is performed only when the first as well as the second and also the third testing operations are successful.

On the other hand the classification operation is terminated by the action block 31 as soon as one of the three testing operations cannot be successfully performed.

In the third computation block 36 successful classification is transmitted to the service system 11 and the data base is updated with new estimates for ALCi*(l) in accordance with the formula (E20), for AGIi* in accordance with the formula (E21), for AGF* in accordance with the formula (E21a), for Cov*$_{(m,n)}$ in accordance with the formula (E22), for $\sigma_{ALCi}*(l)$ in accordance with the formula (E23) and for $\sigma_{AGIi}*$ in accordance with the formula (E24).

If necessary unsuccessful classification is signalled to the receiving system 1, in an instruction from the action block 31.

The described classification system 8 permits secure classification by virtue of the three testing operations, each of which is carried out with differently linked features in respect of the test item 3. By virtue of the fact that many physical features of the test item are detected and interlinked, problematical and expensive selection of significant features loses in importance.

If desired the classification system can evaluate further testing operations such as for example a test in respect of the length or the width of the test item 3.

While there has been described a preferred embodiment of the invention, it will be appreciated by those skilled in the art that various changes and/or modifications may be made thereto within the spirit and scope of the invention as defined in the appended claims.

We claim:

1. Apparatus for classifying a pattern, said apparatus comprising:

(i) a receiving system;

(ii) a pre-processing system;

(iii) a learning classification system, the learning classification system comprising a data base for the classification of a pattern, by means of the values of physical features which are supplied to said receiving system; and a service system, said receiving system and said classification system being connected in an order of enumeration substantially to form a cascade and said service system being connected to an output of said cascade; wherein:

(a) said pre-processing system (a.a) comprises means for performing a pre-processing activity which transforms said values of said physical features into a plurality of local feature vectors $ALC_i(l)$ and (b) said classification system comprises means for performing a plurality of activities which access said data base and of which:

(b.a) a first activity:

(b.a.a) in a first testing operation for each instance in respect of said local feature vectors $ALC_i(l)$ transformed with an operator $\Phi\{\ \}$, performs a comparison with a vectorial reference value $Q_{ALCi}(l)$;

(b.a.b) communicates a result of said first testing operation to a second activity by way of a first data channel which leads from said first activity to a second activity; and (b.a.c) computes a global line feature vector $AGI_i$ from instances of each said local feature vector $ALC_i(l)$ by means of instances of an associated first vectorial estimate $ALC_i*(l)$ stored in said data base and an associated second vectorial estimate $\sigma_{ALCi}*(l)$ stored in said data base, whereafter, only if said first testing operation is successfully performed, (b.b) all global line feature vectors $AGI_i$ are transferred to a third activity by way of a second data channel which leads from said first activity to said third activity, (b.c) said third activity:

(b.c.a) in a second testing operation for each said global line feature vector $AGI_i$ transformed with an operator $\Omega \{\ \}$ which uses a third vectorial estimate $AGI_i^*$ and a fourth vectorial estimate $\sigma_{AGIi}^*$, performs a comparison with a further vectorial reference value $Q_{AGIi}$;

(b.c.b) communicates the result of the second testing operation to said second activity by way of a third data channel which leads from said third activity to said second activity; and (b.c.c) computes a single global surface feature vector AGF from the global line feature vectors $AGI_i$, whereafter, only if said second testing operation is successfully performed, (b.d) said global surface feature vector AGF is transferred to a fourth activity by way of a fourth data channel which leads from said third activity to said fourth activity:

(b.e) said fourth activity:

(b.e.a) computes the Mahalanobis distance $d^2$ between said global surface feature vector AGF and a fifth vectorial estimate AGF* stored in said data base, by means of a covariance matrix $C_{AGF}^*$;

(b.e.b) in a third testing operation performs a comparison between the Mahalanobis distance $d^2$ and a reference value $Q_d^2$; and (b.e.c) communicates the result of the third testing operation to the second activity by way of a fifth data channel which leads from the fourth activity to said second activity;

(b.f) only if all three of said first, second and third testing operations are successfully performed, said second activity (b.f.a) computes (b.f.a.a) new first estimates $ALC_i^*(l)$, (b.f.a.b) new second estimates $\sigma_{ALCi}^*(l)$, (b.f.a.c) new third estimates $AGIi^*$, (b.f.a.d) new fourth estimates $\sigma_{AGIi}^*$ and (b.f.a.e) a new fifth estimate AGF* and also (b.f.a.f) a new covariance matrix $C_{AGF}^*$ and thereby (b.f.b) updates said data base and (b.f.c) also communicates to said service system the ascertained class of said test item.

2. Apparatus according to claim 1 wherein said operator $\Phi\{\ \}$ used by said first activity for said first testing operation is defined by:

$$(\Phi\{ALCi(1)\})^T = \left( \frac{|ALCi_1^*(1) - ALCi^*_1(1)|}{|\sigma_{ALCi^*_1(1)}|}, \frac{|ALCi_2(l) - ALCi^*_2(l)|}{|\sigma_{ALCi^*_2(l)}|}, \ldots, \frac{|ALCi_K(l) - ALCi^*_K(1)|}{|\sigma_{ALCi^*_K(1)}|} \right)$$

wherein the superscript letter T denotes a transposed representation.

3. Apparatus according to claim 1 wherein said operator $\Omega\{\ \}$ used by said third activity for said second testing operation is defined by:

$$(\Omega\{AGIi\})^T = \left( \frac{|AGLi_1 - AGIi^*_1|}{|\sigma_{AGIi^*_1}|}, \frac{|AGLi_2 - AGIi^*_2|}{|\sigma_{AGIi^*_2}|}, \ldots, \frac{|AGLi_K - AGIi^*_K|}{|\sigma_{ALCi^*_K}|} \right).$$

4. Apparatus according to claim 1 wherein said third activity computes said global surface feature vector AGF from a number (N) of line vectors AGIi in accordance with a formula:

$$AGF = \frac{1}{N} \cdot \sum_{i=1}^{N} AGIi.$$

5. Apparatus according to claim 1 wherein said second activity computes said new second estimates $\sigma_{ALCi}^*(l)_t$ approximately as:

$$\sigma_{ALCi}^*(l)_t = \frac{p \cdot \sigma_{ALCi}^*(l)_{t-1} + (\pi/2)^{1/2} \cdot |ALCi(l) - ALCi^*(l)_{t-1}|}{p + 1}$$

wherein old estimates are indexed with t-1 and p is a weighting factor for which $p \geq 0$.

6. Apparatus according to claim 1 wherein said second activity computes said new fourth estimates $\sigma_{AGIi}^*_t$ approximately as:

$$\sigma_{AGIi}^*_t = \frac{p \cdot \sigma_{AGIi}^*_{t-1} + (\pi/2)^{1/2} \cdot |AGIi - AGIi^*_{t-1}|}{p + 1}$$

wherein p is a weighting factor and $p \geq 0$.

7. Apparatus according to claim 1 for the classification of a pattern on a banknote wherein said receiving system for detecting the physical features has a sensor group comprising a number (N) of sensors, wherein each sensor, of a larger number (L) of image portions, measures a respective reflected intensity value in spectral ranges of green, red and infra-red.

8. Apparatus according to claim 7 wherein detected physical features are grouped for further processing as measured three-dimensional vectors mci (l), wherein with i=1 to N and l=1 ... L for the vectors mci (l), the definition $(mci(l))^T = (mci_1(l), mci_2(l), mci_3(l))$ applies, and wherein components with an index 1 contain intensity values in the spectral range green, components with an index 2 contain intensity values in the spectral range red and components with an index 3 contain intensity values of the spectral range infra-red.

9. Apparatus according to claim 8 wherein said preprocessing activity computes said first components of said local feature vectors ALCi (l) by $$ALCi_1(l) = mci_1(l) + mci_2(l) + mci_3(l),$$

$$ALCi_2(l) = \frac{mci_1(l)}{mci_1(l) + mci_2(l) + mci_3(l)},$$

$$ALCi_3(l) = \frac{mci_2(l)}{mci_1(l) + mci_2(l) + mci_3(l)},$$

$$ALCi_4(l) = \frac{mci_1(l)}{\frac{1}{L} \cdot \sum_{j=1}^{L} mci_j},$$

$$ALCi_5(l) = \frac{mci_3(l)}{\frac{1}{L} \cdot \sum_{j=1}^{L} mci_j}.$$

* * * * *

UNITED STATES PATENT AND TRADEMARK OFFICE
CERTIFICATE OF CORRECTION

PATENT NO.   : 5,503,262

DATED        : April 2, 1996

INVENTOR(S)  : Gaston Baudat and Christian Voser

It is certified that error appears in the above-identified patent and that said Letters Patent is hereby corrected as shown below:

On the title page, item [ 57],

In the Abstract, line 11, cancel "provided" and substitute --provide--.

Col. 6, line 40, delete "*" (second occurrence)

Signed and Sealed this

Twenty-fifth Day of November, 1997

Attest:

BRUCE LEHMAN

Attesting Officer

Commissioner of Patents and Trademarks